US009219275B2

United States Patent
Endo

(10) Patent No.: US 9,219,275 B2
(45) Date of Patent: Dec. 22, 2015

(54) ACTIVE MATERIAL FOR NONAQUEOUS ELECTROLYTE SECONDARY BATTERY, METHOD FOR MANUFACTURING ACTIVE MATERIAL, ELECTRODE FOR NONAQUEOUS ELECTROLYTE SECONDARY BATTERY, AND NONAQUEOUS ELECTROLYTE SECONDARY BATTERY

(71) Applicant: GS Yuasa International Ltd., Kyoto (JP)

(72) Inventor: Daisuke Endo, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 14/375,349

(22) PCT Filed: Dec. 5, 2012

(86) PCT No.: PCT/JP2012/081482
§ 371 (c)(1),
(2) Date: Jul. 29, 2014

(87) PCT Pub. No.: WO2013/121654
PCT Pub. Date: Aug. 22, 2013

(65) Prior Publication Data
US 2015/0008364 A1    Jan. 8, 2015

(30) Foreign Application Priority Data
Feb. 16, 2012   (JP) ................. 2012-031949

(51) Int. Cl.
| | |
|---|---|
| *H01M 4/131* | (2010.01) |
| *H01M 4/50* | (2010.01) |
| *H01M 4/525* | (2010.01) |
| *H01M 4/505* | (2010.01) |
| *C01G 53/00* | (2006.01) |
| *H01M 4/52* | (2010.01) |
| *H01M 10/0525* | (2010.01) |
| *H01B 3/10* | (2006.01) |
| *H01M 10/052* | (2010.01) |

(52) U.S. Cl.
CPC ............. *H01M 4/131* (2013.01); *C01G 53/50* (2013.01); *H01M 4/502* (2013.01); *H01M 4/505* (2013.01); *H01M 4/523* (2013.01); *H01M 4/525* (2013.01); *H01M 10/0525* (2013.01); *C01P 2002/22* (2013.01); *C01P 2002/70* (2013.01); *C01P 2002/72* (2013.01); *C01P 2002/76* (2013.01); *C01P 2004/51* (2013.01); *C01P 2004/61* (2013.01); *C01P 2004/62* (2013.01); *C01P 2006/40* (2013.01); *H01M 10/052* (2013.01); *Y02E 60/122* (2013.01); *Y02P 70/54* (2015.11); *Y02T 10/7011* (2013.01)

(58) Field of Classification Search
CPC ........ H01M 4/505; H01M 4/525; C01G 51/00
USPC ...................... 252/182.1; 429/224, 231.3, 223
See application file for complete search history.

(56) References Cited

U.S. PATENT DOCUMENTS

| | | |
|---|---|---|
| 8,382,860 B2 | 2/2013 | Endo et al. |
| 8,440,353 B2 | 5/2013 | Imanari et al. |
| 8,551,659 B2 | 10/2013 | Endo et al. |
| 2012/0145954 A1 | 6/2012 | Endo et al. |
| 2013/0078520 A1 | 3/2013 | Toya et al. |
| 2013/0288129 A1 | 10/2013 | Toya et al. |
| 2013/0313471 A1 | 11/2013 | Endo et al. |
| 2014/0059845 A1 | 3/2014 | Endo et al. |

FOREIGN PATENT DOCUMENTS

| | | |
|---|---|---|
| CN | 101355159 | 1/2009 |
| EP | 1391950 A1 | 2/2004 |
| EP | 2144314 A2 | 1/2010 |
| JP | 2002-100356 | 4/2002 |
| JP | 2007-123255 | 5/2007 |
| JP | 2009-032655 | 2/2009 |
| JP | 2010-086690 | 4/2010 |
| JP | 2011-154997 | 8/2011 |
| JP | 2012-151083 | 8/2012 |
| JP | 2012-151084 | 8/2012 |
| JP | 2012-151085 | 8/2012 |
| JP | 2012-254889 | 12/2012 |
| WO | WO 02086993 A1 * | 10/2002 |

OTHER PUBLICATIONS

International Search Report dated Feb. 12, 2013, Application No. PCT/JP2012/081482.
Extended European Search Report dated Sep. 23, 2015 issued in the corresponding European patent application No. 12868370.3.

* cited by examiner

*Primary Examiner* — Mark Kopec
*Assistant Examiner* — Danny N Kang
(74) *Attorney, Agent, or Firm* — Rankin, Hill & Clark LLP

(57) ABSTRACT

An active material for a nonaqueous electrolyte secondary battery includes a lithium transition metal composite oxide which has an $\alpha$-NaFeO$_2$-type crystal structure, is represented by the compositional formula $Li_{1+\alpha}Me_{1-\alpha}O_2$ (Me is a transition metal element containing Mn, Ni and Co; and $0<\alpha<1$) and satisfies the requirement of $1.250 \leq (1+\alpha)/(1-\alpha) \leq 1.425$. The half-width of a diffraction peak at $2\theta=18.6°\pm1°$ is $0.20°$ to $0.27°$ and/or the half-width of a diffraction peak at $2\theta=44.1°\pm1°$ is $0.26°$ to $0.39°$ in X-ray diffraction measurement using a CuK$\alpha$ radiation. The lithium transition metal composite oxide is observed as a single phase indexed a hexagonal crystal (space group R3-m) on the X-ray diffraction patterns when electrochemically oxidized to a potential of 5.0 V (vs. Li/Li$^+$).

6 Claims, No Drawings

ACTIVE MATERIAL FOR NONAQUEOUS ELECTROLYTE SECONDARY BATTERY, METHOD FOR MANUFACTURING ACTIVE MATERIAL, ELECTRODE FOR NONAQUEOUS ELECTROLYTE SECONDARY BATTERY, AND NONAQUEOUS ELECTROLYTE SECONDARY BATTERY

TECHNICAL FIELD

The present invention relates to an active material for a nonaqueous electrolyte secondary battery and a nonaqueous electrolyte secondary battery using the same.

BACKGROUND ART

Conventionally, $LiCoO_2$ is mainly used as a positive active material for a nonaqueous electrolyte secondary battery. However, a discharge capacity of the $LiCoO_2$ has been about 120 to 130 mAh/g.

A solid solution of $LiCoO_2$ and another compound is known as a material of a positive active material for a nonaqueous electrolyte secondary battery. $Li[Co_{1-2x}Ni_xMn_x]O_2$ ($0 < x \leq 1/2$), which has a crystal structure of an $\alpha$-$NaFeO_2$ type and is a solid solution of three components, $LiCoO_2$, $LiNiO_2$ and $LiMnO_2$, is reported in 2001. $LiNi_{1/2}Mn_{1/2}O_2$ or $LiCo_{1/3}Ni_{1/3}Mn_{1/3}O_2$ as an example of the solid solution has a discharge capacity of 150 to 180 mAh/g and is also excellent in charge-discharge cycle performance.

For the above-mentioned so-called "$LiMeO_2$ type" active material, the so-called "lithium excess type" active material, in which a compositional ratio Li/Me of lithium (Li) to a ratio of a transition metal (Me) is larger than 1 and for example Li/Me is 1.25 to 1.6, is known. A compositional formula of such a material can be denoted by $Li_{1+\alpha}Me_{1-\alpha}O_2$ ($\alpha > 0$). Here, when the compositional ratio Li/Me of lithium (Li) to a ratio of a transition metal (Me) is denoted by $\beta$, since $\beta = (1+\alpha)/(1-\alpha)$, $\alpha = 0.2$ if Li/Me is 1.5.

In Patent Document 1, an active material, which is a kind of such an active material and can be represented as a solid solution of three components of $Li[Li_{1/3}Mn_{2/3}]O_2$, $LiNi_{1/2}Mn_{1/2}O_2$ and $LiCoO_2$, is described. Further, as a method for manufacturing a battery using the above-mentioned active material, it is described that by providing a production process in which charge at least reaching a region, occurring within a positive electrode potential range of more than 4.3 V (vs. Li/Li$^+$) and 4.8 V (vs. Li/Li$^+$) or less, where a potential change is relatively flat is performed, it is possible to manufacture a battery which can achieve a discharge capacity of 177 mAh/g or more even when employing a charge method in which a maximum upper limit potential of a positive electrode at the time of charging is 4.3 (vs. Li/Li$^+$) or less.

The invention of "a layered rock salt-type lithium transition metal composite oxide represented by $Li_{1+x}M_{1-x}O_2$ (M is at least one transition metal selected from nickel, manganese, cobalt, iron, copper, zinc, chromium, titanium and zirconium; and $0 \leq x \leq 0.15$), wherein the content of an acidic root is 1500 ppm or less in terms of a total amount, the content of an alkali metal is 2000 ppm or less in terms of a total amount, and the intensity ratio ($I_{(003)}/I_{(004)}$) of peaks of (003) and (104) lines in X-ray diffraction, which are indexed a hexagonal crystal, is at least 1.4" is known (see Patent Document 2). Further, Patent Document 2 describes a method for production of the lithium transition metal composite oxide ("lithium-excess-type" positive active material), wherein a compound of a transition metal element containing Co, Ni and Mn is coprecipitated to produce a coprecipitation precursor of a transition metal carbonate, the precursor is mixed with a lithium compound, and the mixture is fired at 800 to 900° C., and it is shown that by using the positive active material produced by the above-mentioned method, a nonaqueous electrolyte battery having a high discharge capacity and an excellent rate characteristic is obtained.

PRIOR ART DOCUMENT

Patent Document

Patent Document 1: JP-A-2010-086690
Patent Document 2: JP-A-2007-123255

DISCLOSURE OF THE INVENTION

Problems to be Solved by the Invention

As described above, a conventional so-called "lithium-excess-type" positive active material has a high discharge capacity, but its discharge capacity is not sufficient, and an active material having a higher discharge capacity is demanded. Further, the conventional so-called "lithium-excess-type" positive active material has the problem of being poor in power performance under a low-temperature environment and in a range of from the middle stage of discharge to the last stage of discharge, i.e. a low SOC (state of charge) range as compared to a so called "$LiMeO_2$" positive active material.

An object of the present invention is to provide an active material for a nonaqueous electrolyte secondary battery, which has a high discharge capacity, a method for manufacturing the active material, and a nonaqueous electrolyte secondary battery using the active material.

Means for Solving the Problems

The constitution and the effect of the present invention will be described along with technical concepts. However, the action mechanism includes assumptions, and propriety thereof does not limit the present invention. The present invention may be carried out in various other modes without departing from the spirit of main features of the present invention. Therefore, embodiments or experiment examples described later are merely illustrative in every aspect, and should not be restrictively construed. Further, modifications and changes belonging to equivalents of claims all fall within the scope of the present invention.

A first aspect of the present invention is an active material for a nonaqueous electrolyte secondary battery, the active material including a lithium transition metal composite oxide which has an $\alpha$-$NaFeO_2$-type crystal structure, is represented by the compositional formula $Li_{1+\alpha}Me_{1-\alpha}O_2$ (Me is a transition metal element containing Mn, Ni and Co; and $0 < \alpha < 1$) and satisfies the requirement of $1.250 \leq (1+\alpha)/(1-\alpha) \leq 1.425$. The half-width of a diffraction peak at $2\theta = 18.6° \pm 1°$ is 0.20° to 0.27° and/or the half-width of a diffraction peak at $2\theta = 44.1° \pm 1°$ is 0.26° to 0.39° on X-ray diffraction patterns using a CuK$\alpha$ radiation. The lithium transition metal composite oxide is observed as a single phase indexed a hexagonal crystal (space group R3-m) on the X-ray diffraction patterns when electrochemically oxidized to a potential of 5.0 V (vs. Li/Li$^+$).

A second aspect of the present invention is the active material for a nonaqueous electrolyte secondary battery, wherein the half-width of a diffraction peak at $2\theta = 18.6° \pm 1°$ is 0.208° to 0.247° and/or the half-width of a diffraction peak at 2θ=44.1°±1° is 0.266° to 0.335° on X-ray diffraction patterns using a CuKα radiation.

A third aspect of the present invention is the active material for a nonaqueous electrolyte secondary battery according to the second aspect of the present invention, wherein the 50% particle size (D50) in particle size distribution measurement is 8 μm or less.

A fourth aspect of the present invention is a method for manufacturing the active material for a nonaqueous electrolyte secondary battery according to any one of the first to third aspects of the present invention, the method including the steps of coprecipitating a compound of a transition metal element Me containing Co, Ni and Mn in a solution to produce a coprecipitation precursor of a transition metal carbonate; and mixing the precursor with a lithium compound so that the molar ratio Li/Me of Li to the transition metal element Me in the lithium transition metal composite oxide is 1.25 to 1.425, and firing the mixture at 800 to 900° C.

The present invention is an electrode for a nonaqueous electrolyte secondary battery, which includes the active material for a nonaqueous electrolyte secondary battery.

The present invention is a nonaqueous electrolyte secondary battery including the electrode for a nonaqueous electrolyte secondary battery.

Advantages of the Invention

According to the first aspect of the present invention, there can be provided an active material for a nonaqueous electrolyte secondary battery, which has a high discharge capacity.

According to the second aspect of the present invention, there can be provided an active material for a nonaqueous electrolyte secondary battery, which has an excellent discharge capacity at a low temperature in addition to the above-mentioned effect.

According to the third aspect of the present invention, there can be provided an active material for a nonaqueous electrolyte secondary battery, which has excellent power performance at a low temperature in addition to the above-mentioned effect.

According to the fourth aspect of the present invention, there can be provided a method for manufacturing an active material for a nonaqueous electrolyte secondary battery, which has a high discharge capacity.

DETAILED DESCRIPTION OF THE INVENTION

When the molar ratio Li/Me of Li to a transition metal element Me, which is represented by $(1+\alpha)/(1-\alpha)$ in the compositional formula $Li_{1+\alpha}Me_{1-\alpha}O_2$, is 1.25 to 1.425, a nonaqueous electrolyte secondary battery having a high discharge capacity can be obtained.

Ratios of elements such as Co, Ni and Mn which form the transition metal element which forms the lithium transition metal composite oxide can be arbitrarily selected according to required characteristics.

The molar ratio Co/Me of Co to the transition metal element Me is preferably 0.02 to 0.23, more preferably 0.04 to 0.21, most preferably 0.06 to 0.17 because a nonaqueous electrolyte secondary battery having a high discharge capacity and excellent initial charge-discharge efficiency can be obtained.

The molar ratio Mn/Me of Mn to the transition metal element Me is preferably 0.63 to 0.72, more preferably 0.65 to 0.71 because a nonaqueous electrolyte secondary battery having a high discharge capacity and excellent initial charge-discharge efficiency can be obtained.

The lithium transition metal composite oxide according to the present invention is basically a composite oxide containing Li, Co, Ni and Mn as metal elements, but inclusion of a small amount of other metals such as alkali metals and alkali earth metals such as Na and Ca, transition metals represented by 3d transition metals such as Fe and Cu and metals such as Zn and In within the bounds of not impairing the effect of the present invention is not excluded.

The lithium transition metal composite oxide according to the present invention has an α-NaFeO₂ structure. The lithium transition metal composite oxide after synthesis (before charge-discharge) is indexed the space group $P3_112$, and a superlattice peak (peak observed in a $Li[Li_{1/3}Me_{2/3}]O_2$-type monoclinic crystal) is observed at around 2θ=21° on X-ray diffraction patterns using a CuKα radiation. However, when charge is performed even once to cause desorption of Li in the crystal, the symmetric property of the crystal is changed. The superlattice peak thereby disappears, so that the lithium transition metal composite oxide is indexed the space group R3-m. Here, $P3_112$ is a crystal structure model in which atom positions at 3a, 3b and 6c sites in R3-m are subdivided, and the $P3_112$ model is employed when there is orderliness in atom arrangement in R3-m. Properly, "R3-m" should be written with a bar "-" added above "3" of "R3 m".

The lithium transition metal composite oxide according to the present invention is indexed the space group $P3_112$ or R3-m, wherein the half-width of a diffraction peak at 2θ=18.6°±1° is 0.20° to 0.27° and/or the half-width of a diffraction peak at 2θ=44.1°±1° is 0.26° to 0.39° on X-ray diffraction patterns using a CuKα radiation. The diffraction peak at 2θ=18.6°±1° is indexed to the (003) line in the mirror index hkl for the space groups $P3_112$ and R3-m, and the diffraction at 2θ=44.1°±1° is indexed to the (114) line for the space group $P3_112$ and to the (104) line for the space group R3-m.

Further, the lithium transition metal composite oxide according to the present invention is observed as a single phase indexed a hexagonal crystal (space group R3-m) on X-ray diffraction patterns when electrochemically oxidized to a potential of 5.0 V (vs. Li/Li⁺). A specific observation method is as described in later-described examples.

Here, for satisfying the requirement of being "observed as a single phase of a hexagonal structure on X-ray diffraction patterns", it suffices that when a peak showing the highest intensity in a diffraction pattern obtained by X-ray diffraction measurement is drawn so as to fit within the full scale of the diffraction patterns, no split is visually observed in a peak indexed the (003) line of the hexagonal crystal.

The lithium transition metal composite oxide according to the present invention has a 50% particle size (D50) of 8 μm or less in particle size distribution measurement.

Next, a method for manufacturing an active material for a nonaqueous electrolyte secondary battery of the present invention will be described.

The active material for a nonaqueous electrolyte secondary battery of the present invention can be basically prepared by adjusting a raw material so as to contain metal elements composing the active materials (Li, Mn, Co, Ni) just as the intended composition of the active material (lithium transition metal composite oxide), and finally firing the raw material. However, an amount of a Li material is preferably charged excessively by about 1 to 5% considering that a part of the Li material is disappeared during firing.

As a method for preparing a lithium transition metal composite oxide having the intended composition, the so-called "solid-phase method" in which the respective salts of Li, Co, Ni, and Mn are mixed and fired, and the "coprecipitation method" of previously preparing a coprecipitated precursor in which Co, Ni, and Mn exist in a particle, mixing a salt of Li in the coprecipitated precursor, and firing the resulting mixture are known. In a synthesis process by the "solid-phase method", particularly Mn is hardly solid-solved uniformly in Co or Ni. Therefore, it is difficult to obtain a sample in which the respective elements are distributed uniformly in a particle. In producing the active material for a nonaqueous electrolyte secondary battery of the present invention, selection between the "solid-phase method" and the "coprecipitation method" is not particularly limited. However, when the "solid-phase method" is selected, it is extremely difficult to produce the positive active material of the present invention. Selection of the "coprecipitation method" is preferred in that a more uniform active material is easily obtained.

When preparing the coprecipitated precursor, since Mn among Co, Ni and Mn is easily oxidized, and it is not easy to prepare the coprecipitated precursor in which Co, Ni and Mn are uniformly distributed in a divalent state, uniform mixing of Co, Ni and Mn at an atomic level tends to be insufficient. Particularly, in the range of the composition of the present invention, a ratio of Mn is larger than those of Co and Ni, it is important to remove dissolved oxygen in the aqueous solution. A method of removing dissolved oxygen includes a method comprising bubbling a gas not containing oxygen. The gas not containing oxygen is not particularly limited, and a nitrogen gas, an argon gas, or carbon dioxide ($CO_2$) can be used. Particularly when the coprecipitated precursor of transition metal carbonate (hereinafter, referred to as a "coprecipitated carbonate precursor") is prepared like Example described later, it is preferred to employ carbon dioxide as a gas not containing oxygen since an environment in which carbonate is more easily produced is provided.

A pH in the step of coprecipitating compounds containing Co, Ni and Mn, respectively, in a solution to produce a precursor is not limited, and the pH can be 7.5 to 11 when a coprecipitated carbonate precursor is prepared as the coprecipitated precursor. In order to increase a tapped density, it is preferred to control a pH. When the pH is adjusted to 9.4 or less, the tapped density can be 1.25 g/cc or more to improve the high rate discharge performance. Moreover, when the pH is adjusted to less than 8.5, since a particle growing rate can be accelerated, a time of stirring continued after the completion of dropwise addition of a raw material aqueous solution can be shortened.

The coprecipitation precursor is preferably a compound in which Mn, Ni and Co are uniformly distributed. However, the precursor is not limited to a carbonate, and a hydroxide as well as a hardly soluble salt, in which elements are uniformly distributed, such as a citrate can also be used. A precursor having a higher bulk density can also be prepared by using a crystallization reaction etc. using a complexing agent. At this time, when the precursor is mixed with a Li source and the mixture is fired, an active material having a higher density can be obtained. As a result, the energy density per electrode area can be increased.

A raw material to be used for preparation of the coprecipitation precursor may be in any form as long as it forms a precipitation reaction with an aqueous alkali solution, but use of a metal salt having a high solubility is preferable.

Examples of the raw material of the coprecipitation precursor may include manganese oxide, manganese carbonate, manganese sulfate, manganese nitrate and manganese acetate for the Mn compound, nickel hydroxide, nickel carbonate, nickel sulfate, nickel nitrate and nickel acetate for the Ni compound, and cobalt sulfate, cobalt nitrate and cobalt acetate for the Co compound.

In the coprecipitation method, a coprecipitation precursor is obtained by adding a raw material aqueous solution of the coprecipitation precursor dropwise to a reaction tank kept alkaline. The rate at which the raw material aqueous solution is added dropwise has significant influences on uniformity of element distribution in one particle of the coprecipitation precursor generated. Particularly Mn is hard to form a uniform element distribution with Co and Ni, and therefore caution is required. The dropwise addition rate is preferably 10 ml/min or less, more preferably 5 ml/min, although depending on a size of the reaction tank, stirring conditions, pH, a reaction temperature and so on. At a high rate of 30 ml/min, the crystal structure of the lithium transition metal composite oxide after synthesis may be unstable because the element distribution of Co, Ni and Mn of the precipitation precursor obtained becomes nonuniform as shown in later-described comparative examples.

Further, when a complexing agent is present in the reaction vessel and certain convection conditions are applied, by further continuing stirring after the completion of dropwise addition of the raw material aqueous solution, rotation of particles and revolution of particles in a stirring vessel are promoted, and in this process, particles are formed stepwise into a concentric spherical shape while impinging on one another. That is, the coprecipitated precursor is formed by undergoing a two-step reaction of a metal complex forming reaction occurring when the raw material aqueous solution is added dropwise to the inside of the reaction vessel and a precipitate forming reaction in which the metal complex is produced during staying in the reaction vessel. Accordingly, a coprecipitated precursor with a preferred particle size can be attained by appropriately selecting the time of stirring further continued after the completion of dropwise addition of the raw material aqueous solution.

A preferable time of stirring continued after the completion of dropwise addition of the raw material aqueous solution, on which a size of the reaction vessel, a stirring condition, a pH, a reaction temperature and the like have effects, is preferably 0.5 hour or more, more preferably 1 hour or more, and the most preferably 3 hours or more in order to grow particles in the form of uniform spherical particle. Further, in order to reduce a possibility that power performance of a battery becomes insufficient because the particle size becomes too large, the time of stirring continued is preferably 15 hours or less, more preferably 10 hours or less, and the most preferably 5 hours or less.

Further, a preferred time of stirring continued for adjusting D50, a particle size at which a cumulative volume reaches 50% in a particle size distribution of the secondary particles of the lithium transition metal composite oxide, to 8 μm or less varies depending on a pH to be controlled. For example, when the pH is controlled so as to be 8.3 to 9.0, the time of stirring continued is preferably 4 to 5 hours, and when the pH is controlled so as to be 7.6 to 8.2, the time of stirring continued is preferably 1 to 3 hours.

The active material for a nonaqueous electrolyte secondary battery in the present invention can be suitably produced by mixing the coprecipitated precursor with a Li compound and thereafter carrying out heat treatment for the mixture. Use of lithium hydroxide, lithium carbonate, lithium nitrate, lithium acetate or the like as the Li compound makes it possible to preferably carry out the production.

The firing temperature has an effect on a reversible capacity of the active material.

When the firing temperature is too high, the resulting active material becomes phase-separated while being accompanied with an oxygen releasing reaction and in addition to the hexagonal main phase, a phase defined as monoclinic Li[Li$_{1/3}$Mn$_{2/3}$]O$_2$ tends to be observed as a separate phase but not as a solid solution phase. It is not preferred to contain a too high proportion of such a separate phase since this leads to a reduction of the reversible capacity of the active material. With respect to such a material, impurity peaks are observed near 35° and 45° in the X-ray diffraction pattern. Accordingly, it is preferred that the firing temperature is adjusted lower than the temperature which affects the oxygen releasing reaction of the active material. In the composition range of the present invention, the oxygen releasing temperature of the active material is around 1000° C. or higher; however, the oxygen releasing temperature slightly differs depending on the composition of the active material, and therefore it is preferred to previously check the oxygen releasing temperature of the active material. Particularly, it is confirmed that the oxygen releasing temperature of a precursor is shifted to the lower temperature side as the Co amount contained in a sample is larger, and therefore it needs careful consideration. As a method for checking the oxygen releasing temperature of the active material, a mixture of a coprecipitated precursor and a lithium compound may be subjected to thermogravimetry (DTA-TG measurement) in order to simulate the firing reaction process; however in this method, platinum employed for a sample chamber of a measurement instrument may be possibly corroded with an evaporated Li component to damage the instrument, and therefore a composition, of which crystallization is promoted to a certain extent by employing a firing temperature of about 500° C., is preferable to be subjected to thermogravimetry.

When the firing temperature is excessively high, primary particles may be grown to a micron order even if no impurity peak was observed on the X-ray diffraction patterns. Such an active material cannot have good electrode characteristics because diffusion of lithium ions in the solid phase is insufficient although crystallites are sufficiently grown.

On the other hand, when the firing temperature is excessively low, electrode characteristics tend to be deteriorated because crystallization does not sufficiently proceed. In the present invention, the firing temperature is preferably 800° C. or higher when the precursor is a coprecipitation carbonate. Particularly, when the precursor is a coprecipitation carbonate, the optimum firing temperature tends to become lower as the amount of Co contained in the precursor increases. By sufficiently crystallizing crystallites that form primary particles as described above, the resistance at a crystal boundary can be reduced to promote smooth transportation of lithium ions.

By minutely analyzing a half-width of a diffraction peak of the active material of the present invention, the inventors have confirmed that strain remains in a lattice in a sample synthesized at a temperature of 800° C. or lower, and strain can be almost fully eliminated by synthesis at a temperature higher than 800° C. Further, the size of the crystallite was increased in proportion to the synthesis temperature. Accordingly, a good discharge capacity could also be obtained by seeking particles having little lattice strain in the system and having a sufficiently grown crystallite size in the composition of the active material of the present invention. Specifically, it has been found that employment of a synthesis temperature (firing temperature) and a Li/Me ratio composition at which the strain amount affecting a lattice constant is 2% or less and the crystallite size is grown to 50 nm or more is preferred. When the active material is formed as an electrode and charge-discharge is performed, a change by expansion and contraction is observed. However, it is preferable in terms of an effect obtained that the crystallite size is kept to be 30 nm or more even in the charge-discharge process.

As described above, the preferred firing temperature varies depending on a temperature at which the active material releases oxygen, and therefore it is difficult to set a preferred range of the firing temperature indiscriminately, but the firing temperature is preferably about 800 to 900° C., more preferably 850 to 900° C. for achieving a sufficient discharge capacity when the compositional ratio Li/Me is 1.25 to 1.425.

When the firing time is excessively long, an active material is obtained in which the half-width of a diffraction peak at $2\theta=18.6°\pm1°$ is less than 0.208° and the half-width of a diffraction peak at $2\theta=44.1°\pm1°$ is less than 0.266°. Therefore, for example, the firing time is preferably shorter than 10 h when the firing temperature is 900° C.

The particle shape and the particle size of the lithium transition metal composite oxide obtained by passing through the firing step are almost unchanged from the particle shape and the particle size of the precursor before firing. However, the temperature elevation rate from normal temperature to the firing temperature has influences on the degree of growth of crystal particles of the lithium transition metal composite oxide. Accordingly, the temperature elevation rate is preferably 200° C./h or less, more preferably 100° C./h or less.

A nonaqueous electrolyte to be used for the nonaqueous electrolyte secondary battery of the present invention is not particularly limited and those generally proposed for use for lithium batteries and the like can be used. Examples of nonaqueous solvents to be used for the nonaqueous electrolyte include, but are not limited to, one compound or a mixture of two or more of compounds of cyclic carbonic acid esters such as propylene carbonate, ethylene carbonate, butylene carbonate, chloroethylene carbonate, and vinylene carbonate; cyclic esters such as γ-butyrolactone and γ-valerolactone; chain carbonates such as dimethyl carbonate, diethyl carbonate, and ethylmethyl carbonates; chain esters such as methyl formate, methyl acetate, and methyl butyrate; tetrahydrofuran and derivatives thereof; ethers such as 1,3-dioxane, 1,4-dioxane, 1,2-dimethoxyethane, 1,4-dibutoxyethane, and methyl diglyme; nitriles such as acetonitrile and benzonitrile; dioxolan and derivatives thereof; and ethylene sulfide, sulfolane, sultone and derivatives thereof.

Examples of electrolytic salts to be used for the nonaqueous electrolyte include inorganic ionic salts containing one of lithium (Li), sodium (Na), and potassium (K) such as LiClO$_4$, LiBF$_4$, LiAsF$_6$, LiPF$_6$, LiSCN, LiBr, LiI, Li$_2$SO$_4$, Li$_2$B$_{10}$Cl$_{10}$, NaClO$_4$, NaI, NaSCN, NaBr, KClO$_4$, and KSCN; and organic ionic salts such as LiCF$_3$SO$_3$, LiN(CF$_3$SO$_2$)$_2$, LiN(C$_2$F$_5$SO$_2$)$_2$, LiN(CF$_3$SO$_2$)(C$_4$F$_9$SO$_2$), LiC(CF$_3$SO$_2$)$_3$, LiC(C$_2$F$_5$SO$_2$)$_3$, (CH$_3$)$_4$NBF$_4$, (CH$_3$)$_4$NBr, (C$_2$H$_5$)$_4$NClO$_4$, (C$_2$H$_5$)$_4$NI, (C$_3$H$_7$)$_4$NBr, (n-C$_4$H$_9$)$_4$NClO$_4$, (n-C$_4$H$_9$)$_4$NI, (C$_2$H$_5$)$_4$N-maleate, (C$_2$H$_5$)$_4$N-benzoate, (C$_2$H$_5$)$_4$N-phtalate, lithium stearylsulfonate, lithium octylsulfonate, and lithium dodecylbenzenesulfonate, and these ionic compounds may be used alone or in combination of two or more of them.

Moreover, when LiPF$_6$ or LiBF$_4$ is mixed with a lithium salt having a perfluoroalkyl group such as LiN(C$_2$F$_5$SO$_2$)$_2$ for use, since the viscosity of the electrolyte can be further lowered, the low temperature properties can be further improved and self-discharge can be suppressed, and therefore it is more preferable.

Further, an ambient temperature molten salt or ionic liquid may be used as the nonaqueous electrolyte.

The concentration of the electrolytic salt in the nonaqueous electrolyte is preferably 0.1 mol/l to 5 mol/l, and more preferably 0.5 mol/l to 2.5 mol/l in order to reliably obtain a nonaqueous electrolyte battery having high battery performance.

A negative electrode material is not particularly limited, and any one may be selected as long as it can precipitate or absorb lithium ions. Examples thereof include a titanium-based materials such as lithium titanate having a spinel type crystal structure typified by $Li[Li_{1/3}Me_{5/3}]O_4$; alloy type lithium metal such as Si, Sb and Sn-based materials, lithium alloys (lithium metal-containing alloy such as lithium-silicon, lithium-aluminum, lithium-lead, lithium-tin, lithium-aluminum-tin, lithium-gallium, and Wood alloy), lithium composite oxide (lithium-titanium), silicon oxide as well as alloys capable of absorbing and releasing lithium, carbon materials (e.g. graphite, hard carbon, low temperature calcined carbon, amorphous carbon) and the like.

A powder of the positive active material and a powder of the negative active material preferably have an average particle size of 100 μm or less. Particularly, the powder of the positive active material is desirable to be 10 μm or less for improving the high power performance of the nonaqueous electrolyte battery. In order to obtain a powder in a prescribed shape, a pulverizer or a classifier is used. For example, usable are mortars, ball mills, sand mills, vibration ball mills, planetary ball mills, jet mills, counter jet mills, swirling current type jet mill, and sieves. At the time of pulverization, wet pulverization in co-presence of water or an organic solvent such as hexane can also be employed. A classification method is not particularly limited, and sieves, pneumatic classifiers and the like are employed in both dry and wet manners as required.

The positive active material and the negative active material, which are main constituent components of a positive electrode and a negative electrode, are described in detail, and the positive electrode and the negative electrode may contain an electric conductive agent, a binder, a thickener, a filler and the like as other constituent components besides the above-mentioned main constituent components.

The electric conductive agent is not particularly limited as long as it is an electron conductive material having no adverse effect on the battery performance, and it may be, in general, electric conductive materials such as natural graphite (scaly graphite, flake graphite, amorphous graphite), artificial graphite, carbon black, acetylene black, Ketjen black, carbon whisker, carbon fibers, powders of metals (copper, nickel, aluminum, silver, gold, etc.), metal fibers and electric conductive ceramic materials, and one or a mixture of these materials may be contained in the positive electrode and the negative electrode.

As an electric conductive agent among them, acetylene black is preferred from the viewpoints of electron conductivity and coatability. The additive amount of the electric conductive agent is preferably 0.1% by weight to 50% by weight, and particularly preferably 0.5% by weight to 30% by weight with respect to the total weight of the positive electrode or the negative electrode. Particularly, when acetylene black is pulverized into ultrafine particles of 0.1 to 0.5 μm and used, it is preferred since the carbon amount to be needed can be saved. A method of mixing these compounds is physical mixing and uniform mixing is preferred. Therefore, powder mixers such as V-shaped mixers, S-shaped mixers, Raikai mixers, ball mills, and planetary ball mills may be used to carry out dry or wet mixing.

As the binder, in general, thermoplastic resins such as polytetrafluoroethylene (PTFE), polyvinylidene fluoride (PVDF), polyethylene and polypropylene; and polymers having rubber elasticity such as ethylene-propylene-diene terpolymer (EPDM), sulfonated EPDM, styrene-butadiene rubber (SBR) and fluorine-contained rubber can be used singly or in combination of two or more of them. The additive amount of the binder is preferably 1 to 50% by weight and particularly preferably 2 to 30% by weight with respect to the total weight of the positive electrode or the negative electrode.

The filler is not particularly limited as long as it is a material having no adverse effect on the battery performance. In general, usable are olefin-based polymers such as polypropylene and polyethylene; amorphous silica, alumina, zeolite, glass, carbon and the like. The additive amount of the filler is preferably 30% by weight or less with respect to the total weight of the positive electrode or the negative electrode.

The positive electrode and the negative electrode is preferably prepared by kneading the main constituent components (the positive active material in the positive electrode and the negative active material in the negative electrode) and other materials to form a composite, then mixing the composite with an organic solvent such as N-methylpyrrolidone, toluene or the like, applying the resulting mixed solutions onto current collectors described below or press-bonding the mixed solution to the current collectors, and carrying out heat treatment at a temperature of about 50° C. to 250° C. for about 2 hours. The application method is preferably carried out to give an arbitrary thickness and an arbitrary shape by using means such as roller coating of an applicator roll or the like, screen coating, doctor blade coating, spin coating, and bar coaters; however, it is not limited thereto.

As a separator, porous membranes and nonwoven fabrics having excellent high rate discharge performance are preferably used alone or in combination. Examples of materials constituting a separator for a nonaqueous electrolyte battery include polyolefin-based resins typified by polyethylene and polypropylene; polyester-based resins typified by polyethylene terephthalate and polybutylene terephthalate; polyvinylidene fluoride, vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

The porosity of the separator is preferably 98% by volume or less from the viewpoint of strength. Further, from the viewpoint of charge-discharge property, the porosity is preferably 20% by volume or more.

Further, the separator may be a polymer gel composed of, for example, a polymer of acrylonitrile, ethylene oxide, propylene oxide, methyl methacrylate, vinyl acetate, vinylpyrrolidone or polyvinylidene fluoride and an electrolyte. When the nonaqueous electrolyte is used in a gel state as described above, it is preferable since it is effective to prevent liquid leakage.

Furthermore, in the separator, when the above-mentioned porous membranes or nonwoven fabrics are used in combination with the polymer gel, it is preferable since the electrolyte retention property is improved. That is, a film is obtained by coating the surface and pore wall surfaces of a polyethylene fine porous membrane with a solvophilic polymer having a thickness of several μm or less and retaining the electrolyte within the pores of the film, so that the solvophilic polymer can gelate.

Examples of the solvophilic polymer include polyvinylidene fluoride and also polymers crosslinked by acrylate monomers having ethylene oxide groups or ester groups, epoxy monomers, and monomers having isocyanato groups. Crosslinking reactions of the monomers can be carried out by heating or using ultraviolet rays (UV) with a radical initiator in combination or using activation beam such as electron beam (EB).

The configuration of the nonaqueous electrolyte secondary battery is not particularly limited and examples thereof include cylindrical batteries, prismatic batteries, and flat type batteries including the positive electrode, negative electrode, and roll type separator.

The conventional positive active material and the positive active material of the present invention can be charged and discharged when the positive electrode potential reaches the vicinity of 4.5 V (vs. Li/Li$^+$). However, when the positive electrode potential at the time of charge is too high, there is a possibility that a nonaqueous electrolyte is oxidized and decomposed to cause a reduction in battery performance depending on a type of the nonaqueous electrolyte to be used. Accordingly, there may be cases where a nonaqueous electrolyte secondary battery capable of achieving a sufficient discharge capacity even when a charge method, in which a maximum upper limit potential of the positive electrode at the time of charge is 4.3 V (vs. Li/Li$^+$) or less, is employed at the time of use, is required. When the active material of the present invention is used, it is possible to extract discharge capacity of about 200 mAh/g or more, which exceeds a capacity of a conventional positive active material even when a charge method, in which a maximum upper limit potential of the positive electrode at the time of charge is lower than 4.5 V (vs. Li/Li$^+$), for example, 4.4 V (vs. Li/Li$^+$) or less or 4.3 V (vs. Li/Li$^+$) or less, is employed at the time of use.

In order to make the positive active material of the present invention have a high discharge capacity, it is preferred that a ratio, at which transition metal elements composing the lithium transition metal composite oxide exist in a part other than a transition metal site in a crystal structure of a layered rock salt type, is low. This can be achieved by adequately uniform distribution of transition metal elements such as Co, Ni and Mn in the precursor to be subjected to a firing step, and by selecting appropriate conditions of a firing step for promoting crystallization of an active material sample. When transition metals are not uniformly distributed in the precursor to be subjected to a firing step, a sufficient discharge capacity cannot be obtained. The reason for this is not necessarily clear, but the present inventor considers that this results from the fact that when transition metals are not uniformly distributed in the precursor to be subjected to a firing step, the resulting lithium transition metal composite oxide falls into a state of so-called cation mixing where a part of transition metal elements exists in a part other than a transition metal site, that is, a lithium site, in a crystal structure of a layered rock salt type. Similar consideration can also be applied in a crystallization process in the firing step. When crystallization of the active material sample is inadequate, cation mixing in a crystal structure of a layered rock salt type tends to occur. The precursor in which distributions of the transition metal elements are highly uniform tends to have a larger intensity ratio between the diffraction peaks of a (003) line and a (104) line based on X-ray diffraction measurement. In the present invention, it is preferred that the ratio between the diffraction peak intensity $I_{(003)}$ of a (003) line and the diffraction peak intensity $I_{(104)}$ of a (104) line based on the X-ray diffraction measurement satisfies the relation of $I_{(003)}/I_{(404)} \geq 1.20$. Further, it is preferred to satisfy the relation of $I_{(103)}/I_{(104)} > 1$ in a state of a discharge end after charge-discharge. When a synthesis condition or a synthesis procedure of the precursor is improper, the peak intensity ratio becomes smaller and often becomes a value less than 1.

By employing synthesis conditions and synthesis procedures respectively described in the present specification, the above-mentioned high performance positive active material can be obtained. Particularly, even when an upper limit potential of charge is set below 4.5 V, for example, 4.4 V or 4.3 V, a positive active material for a nonaqueous electrolyte secondary battery which can attain a high discharge capacity can be formed.

EXAMPLE 1

Cobalt sulfate heptahydrate (14.08 g), nickel sulfate hexahydrate (21.00 g) and manganese sulfate pentahydrate (65.27 g) were weighed, and they were totally dissolved in ion-exchange water (200 ml) to prepare a 2.0 M aqueous sulfate solution of which the molar ratio of Co:Ni:Mn was 12.50:19.94:67.56. Meanwhile, ion-exchange water (750 ml) was poured into a 2 L reaction tank, and a $CO_2$ gas was bubbled for 30 minutes to dissolve $CO_2$ gas in the ion-exchange water. The temperature of the reaction tank was set to 50° C. (±2° C.), and the aqueous sulfate solution was added dropwise at a rate of 3 ml/min while the contents in the reaction tank were stirred at a rotation speed of 700 rpm using a paddle impeller equipped with a stirring motor. Here, control was performed so that pH in the reaction tank was kept at 7.9 (±0.05) by appropriately adding dropwise an aqueous solution containing 2.0 M sodium carbonate and 0.4 M ammonia over a time period between the start and the end of dropwise addition. After completion of dropwise addition, stirring the contents in the reaction tank was continued for further 3 hours. After stirring was stopped, the reaction tank was left standing for 12 hours or more.

Next, particles of a coprecipitation carbonate generated in the reaction tank were separated using a suction filtration device. Sodium ions deposited on the particles were further washed off using ion-exchange water. The particles were dried at 100° C. under normal pressure in an air atmosphere using an electric furnace. Thereafter, the particles were ground for several minutes with an automatic mortar made of agate for equalizing the particle size. In this way, a coprecipitation carbonate precursor was prepared.

0.970 g of Lithium carbonate was added to 2.278 g of the coprecipitation carbonate precursor, and the mixture was sufficiently mixed using an automatic mortar made of agate, thereby preparing a mixed powder of which the molar ratio of Li:(Co, Ni, Mn) was 130:100. Using a pellet molding machine, the mixed powder was molded at a pressure of 6 MPa to form pellets having a diameter of 25 mm. The amount of the mixed powder subjected to pellet molding was determined by performing conversion so that the expected mass of the final product was 2 g. One of the pellets was placed on an aluminum boat having a total length of about 100 mm. The aluminum boat was installed in a box-type electric furnace (model: AMF 20), heated to 800° C. from normal temperature over 10 hours under a normal pressure in an air atmosphere, and fired at 800° C. for 4 hours. The box-type electric furnace has an internal dimension of 10 cm (height)×20 cm (width)×30 cm (depth), and provided with electrically heated wires at intervals of 20 cm in the width direction. After firing, a heater was switched off, and the alumina boat was naturally cooled as it was left standing in the furnace. As a result, the temperature of the furnace decreased to about 200° C. after 5 hours, but the subsequent temperature decreasing rate was slightly mild. After confirming that the temperature of the furnace was 100° C. or lower after elapse of a whole day and night, the pellets were taken out, and ground with an automatic mortar made of agate for equalizing the particle size. In this way, a lithium transition metal composite oxide according to Example 1 was prepared.

EXAMPLE 2

A lithium transition metal composite oxide according to Example 2 was prepared in the same manner as in Example 1 except that in the firing step, the temperature was elevated to 825° C. from normal temperature over 10 hours, and firing was performed at 825° C. for 4 hours.

EXAMPLE 3

A lithium transition metal composite oxide according to Example 3 was prepared in the same manner as in Example 1 except that in the firing step, the temperature was elevated to 850° C. from normal temperature over 10 hours, and firing was performed at 850° C. for 4 hours.

EXAMPLE 4

A lithium transition metal composite oxide according to Example 4 was prepared in the same manner as in Example 1 except that in the firing step, the temperature was elevated to 875° C. from normal temperature over 10 hours, and firing was performed at 875° C. for 4 hours.

EXAMPLE 5

A lithium transition metal composite oxide according to Example 5 was prepared in the same manner as in Example 1 except that in the firing step, the temperature was elevated to 900° C. from normal temperature over 10 hours, and firing was performed at 900° C. for 4 hours.

EXAMPLE 6

A lithium transition metal composite oxide according to Example 6 was prepared in the same manner as in Example 1 except that in the step of preparing a coprecipitation carbonate precursor, the time during which stirring of the contents in the reaction tank was further continued after completion of dropwise addition of the aqueous sulfate solution was changed to 1 hour.

EXAMPLE 7

A lithium transition metal composite oxide according to Example 7 was prepared in the same manner as in Example 2 except that in the step of preparing a coprecipitation carbonate precursor, the time during which stirring of the contents in the reaction tank was further continued after completion of dropwise addition of the aqueous sulfate solution was changed to 1 hour.

EXAMPLE 8

A lithium transition metal composite oxide according to Example 8 was prepared in the same manner as in Example 3 except that in the step of preparing a coprecipitation carbonate precursor, the time during which stirring of the contents in the reaction tank was further continued after completion of dropwise addition of the aqueous sulfate solution was changed to 1 hour.

EXAMPLE 9

A lithium transition metal composite oxide according to Example 9 was prepared in the same manner as in Example 4 except that in the step of preparing a coprecipitation carbonate precursor, the time during which stirring of the contents in the reaction tank was further continued after completion of dropwise addition of the aqueous sulfate solution was changed to 1 hour.

EXAMPLE 10

A lithium transition metal composite oxide according to Example 10 was prepared in the same manner as in Example 5 except that in the step of preparing a coprecipitation carbonate precursor, the time during which stirring of the contents in the reaction tank was further continued after completion of dropwise addition of the aqueous sulfate solution was changed to 1 hour.

EXAMPLE 11

A lithium transition metal composite oxide according to Example 11 was prepared in the same manner as in Example 5 except that in the step of preparing a coprecipitation carbonate precursor, the time during which stirring of the contents in the reaction tank was further continued after completion of dropwise addition of the aqueous sulfate solution was changed to 5 hours.

EXAMPLE 12

A lithium transition metal composite oxide according to Example 12 was prepared in the same manner as in Example 5 except that in the step of preparing a coprecipitation carbonate precursor, the time during which stirring of the contents in the reaction tank was further continued after completion of dropwise addition of the aqueous sulfate solution was changed to 10 hours.

EXAMPLE 13

A lithium transition metal composite oxide according to Example 13 was prepared in the same manner as in Example 5 except that in the step of preparing a coprecipitation carbonate precursor, the time during which stirring of the contents in the reaction tank was further continued after completion of dropwise addition of the aqueous sulfate solution was changed to 15 hours.

EXAMPLE 14

A lithium transition metal composite oxide according to Example 14 was prepared in the same manner as in Example 5 except that in the step of preparing a coprecipitation carbonate precursor, the time during which stirring of the contents in the reaction tank was further continued after completion of dropwise addition of the aqueous sulfate solution was changed to 20 hours.

EXAMPLE 15

A lithium transition metal composite oxide according to Example 15 was prepared in the same manner as in Example 5 except that 0.943 g of lithium carbonate was added to 2.304 g of the coprecipitation carbonate precursor prepared in Example 1, the mixture was sufficiently mixed using an automatic mortar made of agate to prepare a mixed powder of which the molar ratio of Li:(Co, Ni, Mn) was 125:100, and the mixed powder was used as a mixed powder subjected to pellet molding.

EXAMPLE 16

A lithium transition metal composite oxide according to Example 16 was prepared in the same manner as in Example 5 except that 0.957 g of lithium carbonate was added to 2.291 g of the coprecipitation carbonate precursor prepared in Example 1, the mixture was sufficiently mixed using an automatic mortar made of agate to prepare a mixed powder of which the molar ratio of Li:(Co, Ni, Mn) was 127.5:100, and the mixed powder was used as a mixed powder subjected to pellet molding.

EXAMPLE 17

A lithium transition metal composite oxide according to Example 17 was prepared in the same manner as in Example 5 except that 0.983 g of lithium carbonate was added to 2.265 g of the coprecipitation carbonate precursor prepared in Example 1, the mixture was sufficiently mixed using an automatic mortar made of agate to prepare a mixed powder of which the molar ratio of Li:(Co, Ni, Mn) was 132.5:100, and the mixed powder was used as a mixed powder subjected to pellet molding.

EXAMPLE 18

A lithium transition metal composite oxide according to Example 18 was prepared in the same manner as in Example 5 except that 0.996 g of lithium carbonate was added to 2.253 g of the coprecipitation carbonate precursor prepared in Example 1, the mixture was sufficiently mixed using an automatic mortar made of agate to prepare a mixed powder of which the molar ratio of Li:(Co, Ni, Mn) was 135:100, and the mixed powder was used as a mixed powder subjected to pellet molding.

EXAMPLE 19

A lithium transition metal composite oxide according to Example 19 was prepared in the same manner as in Example 5 except that 1.009 g of lithium carbonate was added to 2.241 g of the coprecipitation carbonate precursor prepared in Example 1, the mixture was sufficiently mixed using an automatic mortar made of agate to prepare a mixed powder of which the molar ratio of Li:(Co, Ni, Mn) was 137.5:100, and the mixed powder was used as a mixed powder subjected to pellet molding.

EXAMPLE 20

A lithium transition metal composite oxide according to Example 20 was prepared in the same manner as in Example 5 except that 1.022 g of lithium carbonate was added to 2.228 g of the coprecipitation carbonate precursor prepared in Example 1, the mixture was sufficiently mixed using an automatic mortar made of agate to prepare a mixed powder of which the molar ratio of Li:(Co, Ni, Mn) was 140:100, and the mixed powder was used as a mixed powder subjected to pellet molding.

EXAMPLE 21

A lithium transition metal composite oxide according to Example 21 was prepared in the same manner as in Example 5 except that 1.035 g of lithium carbonate was added to 2.216 g of the coprecipitation carbonate precursor prepared in Example 1, the mixture was sufficiently mixed using an automatic mortar made of agate to prepare a mixed powder of which the molar ratio of Li:(Co, Ni, Mn) was 142.5:100, and the mixed powder was used as a mixed powder subjected to pellet molding.

EXAMPLE 22

A lithium transition metal composite oxide according to Example 22 was prepared in the same manner as in Example 15 except that in the step of preparing a coprecipitation carbonate precursor, the time during which stirring of the contents in the reaction tank was further continued after completion of dropwise addition of the aqueous sulfate solution was changed to 1 hour.

EXAMPLE 23

A lithium transition metal composite oxide according to Example 23 was prepared in the same manner as in Example 16 except that in the step of preparing a coprecipitation carbonate precursor, the time during which stirring of the contents in the reaction tank was further continued after completion of dropwise addition of the aqueous sulfate solution was changed to 1 hour.

EXAMPLE 24

A lithium transition metal composite oxide according to Example 24 was prepared in the same manner as in Example 17 except that in the step of preparing a coprecipitation carbonate precursor, the time during which stirring of the contents in the reaction tank was further continued after completion of dropwise addition of the aqueous sulfate solution was changed to 1 hour.

EXAMPLE 25

A lithium transition metal composite oxide according to Example 25 was prepared in the same manner as in Example 18 except that in the step of preparing a coprecipitation carbonate precursor, the time during which stirring of the contents in the reaction tank was further continued after completion of dropwise addition of the aqueous sulfate solution was changed to 1 hour.

EXAMPLE 26

A lithium transition metal composite oxide according to Example 26 was prepared in the same manner as in Example 19 except that in the step of preparing a coprecipitation carbonate precursor, the time during which stirring of the contents in the reaction tank was further continued after completion of dropwise addition of the aqueous sulfate solution was changed to 1 hour.

EXAMPLE 27

A lithium transition metal composite oxide according to Example 27 was prepared in the same manner as in Example 20 except that in the step of preparing a coprecipitation carbonate precursor, the time during which stirring of the contents in the reaction tank was further continued after completion of dropwise addition of the aqueous sulfate solution was changed to 1 hour.

EXAMPLE 28

A lithium transition metal composite oxide according to Example 28 was prepared in the same manner as in Example 21 except that in the step of preparing a coprecipitation carbonate precursor, the time during which stirring of the contents in the reaction tank was further continued after completion of dropwise addition of the aqueous sulfate solution was changed to 1 hour.

EXAMPLE 29

A lithium transition metal composite oxide according to Example 29 was prepared in the same manner as in Example 5 except that in the step of preparing a coprecipitation carbonate precursor, the rate at which the aqueous sulfate solution was added dropwise was 10 ml/min.

EXAMPLE 30

A lithium transition metal composite oxide according to Example 30 was prepared in the same manner as in Example 5 except that in the step of preparing a coprecipitation carbonate precursor, the molar ratio of Co:Ni Mn contained in the aqueous sulfate solution was 4.00:28.44:67.56.

EXAMPLE 31

A lithium transition metal composite oxide according to Example 31 was prepared in the same manner as in Example 5 except that in the step of preparing a coprecipitation carbonate precursor, the molar ratio of Co:Ni Mn contained in the aqueous sulfate solution was 21.00:11.44:67.56.

EXAMPLE 32

A lithium transition metal composite oxide according to Example 32 was prepared in the same manner as in Example 5 except that in the step of preparing a coprecipitation carbonate precursor, the molar ratio of Co:Ni Mn contained in the aqueous sulfate solution was 12.50:24.50:63.00.

EXAMPLE 33

A lithium transition metal composite oxide according to Example 33 was prepared in the same manner as in Example 5 except that in the step of preparing a coprecipitation carbonate precursor, the molar ratio of Co:Ni Mn contained in the aqueous sulfate solution was 12.50:15.50:72.00.

COMPARATIVE EXAMPLE 1

A lithium transition metal composite oxide according to Comparative Example 1 was prepared in the same manner as in Example 1 except that in the firing step, the temperature was elevated to 700° C. from normal temperature over 10 hours, and firing was performed at 700° C. for 4 hours.

COMPARATIVE EXAMPLE 2

A lithium transition metal composite oxide according to Comparative Example 2 was prepared in the same manner as in Example 1 except that in the firing step, the temperature was elevated to 750° C. from normal temperature over 10 hours, and firing was performed at 750° C. for 4 hours.

COMPARATIVE EXAMPLE 3

A lithium transition metal composite oxide according to Comparative Example 3 was prepared in the same manner as in Example 1 except that in the firing step, the temperature was elevated to 950° C. from normal temperature over 10 hours, and firing was performed at 950° C. for 4 hours.

COMPARATIVE EXAMPLE 4

A lithium transition metal composite oxide according to Comparative Example 4 was prepared in the same manner as in Example 1 except that in the firing step, the temperature was elevated to 1000° C. from normal temperature over 10 hours, and firing was performed at 1000° C. for 4 hours.

COMPARATIVE EXAMPLE 5

A lithium transition metal composite oxide according to Comparative Example 5 was prepared in the same manner as in Example 20 except that in the firing step, the temperature was elevated to 900° C. from normal temperature over 10 hours, and firing was performed at 900° C. for 10 hours.

COMPARATIVE EXAMPLE 6

A lithium transition metal composite oxide according to Comparative Example 6 was prepared in the same manner as in Example 5 except that 1.047 g of lithium carbonate was added to 2.204 g of the coprecipitation carbonate precursor prepared in Example 1, the mixture was sufficiently mixed using an automatic mortar made of agate to prepare a mixed powder of which the molar ratio of Li:(Co, Ni, Mn) was 145:100, and the mixed powder was used as a mixed powder subjected to pellet molding.

COMPARATIVE EXAMPLE 7

A lithium transition metal composite oxide according to Comparative Example 7 was prepared in the same manner as in Example 10 except that 1.047 g of lithium carbonate was added to 2.204 g of the coprecipitation carbonate precursor prepared in Example 1, the mixture was sufficiently mixed using an automatic mortar made of agate to prepare a mixed powder of which the molar ratio of Li:(Co, Ni, Mn) was 145:100, and the mixed powder was used as a mixed powder subjected to pellet molding.

COMPARATIVE EXAMPLE 8

A lithium transition metal composite oxide according to Example 8 was prepared in the same manner as in Example 5 except that in the step of preparing a coprecipitation carbonate precursor, the rate at which the aqueous sulfate solution was added dropwise was 30 ml/min.

COMPARATIVE EXAMPLE 9

Lithium carbonate ($Li_2CO_3$), cobalt hydroxide ($Co(OH)_2$), nickel hydroxide ($Ni(OH)_2$) and manganese oxyhydroxide (MnOOH) were weighed so that the ratio of Li, Co, Ni and Mn elements was 130:12.5:19.94:67.56, and the raw materials were sufficiently mixed and ground with a mortar to obtain a raw material mixture. The raw material mixture (3 g) was taken out, and fired in the air at 900° C. for 10 hours. In this way, a lithium transition metal composite oxide according to Comparative Example 9 was obtained.

Manufacturing conditions in Examples 1 to 33 and Comparative Examples 1 to 9 are arranged and shown in Table 1.

Measurement of Half-Width

For the lithium transition metal composite oxides according to Examples 1 to 33 and Comparative Examples 1 to 9, powder X-ray diffraction measurement was performed using an X-ray diffractometer (manufactured by Rigaku Corporation, model: MiniFlexID. The ray source was CuKα, and the

TABLE 1

| | Li/Me ratio | Precursor preparation method | Dropwise addition rate (ml/min) | Stirring time (h) after dropwise addition | Firing temperature (° C.) |
|---|---|---|---|---|---|
| Example 1 | 1.30 | Carbonate coprecipitation method | 3 | 3 | 800 |
| Example 2 | 1.30 | Carbonate coprecipitation method | 3 | 3 | 825 |
| Example 3 | 1.30 | Carbonate coprecipitation method | 3 | 3 | 850 |
| Example 4 | 1.30 | Carbonate coprecipitation method | 3 | 3 | 875 |
| Example 5 | 1.30 | Carbonate coprecipitation method | 3 | 3 | 900 |
| Example 6 | 1.30 | Carbonate coprecipitation method | 3 | 1 | 800 |
| Example 7 | 1.30 | Carbonate coprecipitation method | 3 | 1 | 825 |
| Example 8 | 1.30 | Carbonate coprecipitation method | 3 | 1 | 850 |
| Example 9 | 1.30 | Carbonate coprecipitation method | 3 | 1 | 875 |
| Example 10 | 1.30 | Carbonate coprecipitation method | 3 | 1 | 900 |
| Example 11 | 1.30 | Carbonate coprecipitation method | 3 | 5 | 900 |
| Example 12 | 1.30 | Carbonate coprecipitation method | 3 | 10 | 900 |
| Example 13 | 1.30 | Carbonate coprecipitation method | 3 | 15 | 900 |
| Example 14 | 1.30 | Carbonate coprecipitation method | 3 | 20 | 900 |
| Example 15 | 1.25 | Carbonate coprecipitation method | 3 | 3 | 900 |
| Example 16 | 1.275 | Carbonate coprecipitation method | 3 | 3 | 900 |
| Example 17 | 1.325 | Carbonate coprecipitation method | 3 | 3 | 900 |
| Example 18 | 1.35 | Carbonate coprecipitation method | 3 | 3 | 900 |
| Example 19 | 1.375 | Carbonate coprecipitation method | 3 | 3 | 900 |
| Example 20 | 1.40 | Carbonate coprecipitation method | 3 | 3 | 900 |
| Example 21 | 1.425 | Carbonate coprecipitation method | 3 | 3 | 900 |
| Example 22 | 1.25 | Carbonate coprecipitation method | 3 | 1 | 900 |
| Example 23 | 1.275 | Carbonate coprecipitation method | 3 | 1 | 900 |
| Example 24 | 1.325 | Carbonate coprecipitation method | 3 | 1 | 900 |
| Example 25 | 1.35 | Carbonate coprecipitation method | 3 | 1 | 900 |
| Example 26 | 1.375 | Carbonate coprecipitation method | 3 | 1 | 900 |
| Example 27 | 1.40 | Carbonate coprecipitation method | 3 | 1 | 900 |
| Example 28 | 1.425 | Carbonate coprecipitation method | 3 | 1 | 900 |
| Example 29 | 1.30 | Carbonate coprecipitation method | 10 | 3 | 900 |
| Example 30 | 1.30 | Carbonate coprecipitation method | 3 | 3 | 900 |
| Example 31 | 1.30 | Carbonate coprecipitation method | 3 | 3 | 900 |
| Example 32 | 1.30 | Carbonate coprecipitation method | 3 | 3 | 900 |
| Example 33 | 1.30 | Carbonate coprecipitation method | 3 | 3 | 900 |
| Comparative Example 1 | 1.30 | Carbonate coprecipitation method | 3 | 3 | 700 |
| Comparative Example 2 | 1.30 | Carbonate coprecipitation method | 3 | 3 | 750 |
| Comparative Example 3 | 1.30 | Carbonate coprecipitation method | 3 | 3 | 950 |
| Comparative Example 4 | 1.30 | Carbonate coprecipitation method | 3 | 3 | 1000 |
| Comparative Example 5 | 1.40 | Carbonate coprecipitation method | 3 | 3 | 900 |
| Comparative Example 6 | 1.45 | Carbonate coprecipitation method | 3 | 3 | 900 |
| Comparative Example 7 | 1.45 | Carbonate coprecipitation method | 3 | 1 | 900 |
| Comparative Example 8 | 1.30 | Carbonate coprecipitation method | 30 | 3 | 900 |
| Comparative Example 9 | 1.30 | Solid phase method | — | — | 900 |

It was confirmed that the composition ratio of the transition metal Me was Co:Ni:Mn=12.5:19.94:67.56 as a result of composition analysis of the lithium transition metal composite oxides according to Examples 1 to 29 and Comparative Examples 1 to 9. It was also confirmed that the composition ratio of the lithium transition metal Me was Co:Ni:Mn=4.0:28.44:67.56, 21.00:11.44:67.56, 12.5:24.5:63.0 and 12.5:15.5:72.0 for Examples 30 to 33, respectively, and the Li/Me ratio was identical to the value in the column of "Li/Me ratio" in Table 1.

accelerating voltage and current were 30 kV and 15 mA, respectively. With the obtained X-ray diffraction data, half-widths were determined for diffraction peaks present at $2\theta=18.6°\pm1°$ and $2\theta=44.1°\pm1°$ on X-ray diffraction patterns using "PDXL" that is attached software of the X-ray diffractometer. Measured half-widths of diffraction peaks are shown in Table 2.

The lithium transition metal composite oxides (active materials before being electrochemically oxidized) according to Examples 1 to 33 and Comparative Examples 1 to 7 were all found to be in the form of a single phase having an α-NaFeO$_2$-type crystal structure and indexed the space group P3$_1$12.

Measurement of Particle Size

The lithium transition metal composite oxides according to Examples 1 to 33 and Comparative Examples 1 to 9 were measured for the particle size distribution in accordance with the following conditions and procedure. Microtrac (model: MT 3000) manufactured by NIKKISO CO., LTD. was used as a measuring apparatus. The measuring apparatus includes an optical stage, a sample supply section and a computer including control software, and a wet cell having a laser light transmission window is placed on the optical stage. For the measurement principle, a wet cell, through which a dispersion with a measurement object sample dispersed in a dispersive solvent is circulated, is irradiated with laser light, and a distribution of scattered light from the measurement sample is converted into a particle size distribution. The dispersion is stored in a sample supply section, and cyclically supplied to the wet cell by a pump. The sample supply section constantly receives ultrasonic vibrations. For this measurement, water was used as a dispersive solvent. Microtrac DHS for Win 98 (MT 3000) was used as measurement control software. For "substance information" set and input in the measuring apparatus, a value of 1.33 was set as the "refractive index" of the solvent, "Transparent" was selected as the "transparency", and "Nonspherical" was selected as the "spherical particle". A "Set Zero" operation is performed prior to measurement of the sample. The "Set Zero" operation is an operation for subtracting influences on subsequent measurements of disturbance factors (glass, contamination of the glass wall face, glass irregularities, etc.) other than scattered light from particles, wherein only water as a dispersive solvent is fed in a sample supply section, background measurement is performed with only water as a dispersive solvent being circulated through a wet cell, and background data is stored in a computer. Subsequently, a "Sample LD (Sample Loading)" operation is performed. The Sample LD operation is an operation for optimizing the concentration of a sample in a dispersion that is cyclically supplied to a wet cell during measurement, wherein a measurement object sample is manually introduced into a sample supply section in accordance with instructions of measurement control software until an optimum amount is reached. Subsequently, a "measurement" button is depressed, so that a measurement operation is performed. The measurement operation is repeated twice and as an average thereof, a measurement result is output from a computer. The measurement result is acquired as a particle size distribution histogram, and the values of D10, D50 and D90 (D10, D50 and D90 are particle sizes at which the cumulative volume in the particle size distribution of secondary particles is 10%, 50% and 90%, respectively. The measured value of D50 is shown as a "D50 particle size (μm)" in Table 2.

Preparation of Nonaqueous Electrolyte Secondary Battery

Using the lithium transition metal composite oxide of each of Examples 1 to 33 and Comparative Examples 1 to 9 as a positive active material for a nonaqueous electrolyte secondary battery, a nonaqueous electrolyte secondary battery was prepared in accordance with the following procedure, and battery characteristics were evaluated.

A positive active material, acetylene black (AB) and polyvinylidene fluoride (PVdF) were mixed at a mass ratio of 85:8:7. To this mixture was added N-methylpyrrolidone as a dispersion medium, and the mixture was mixed and dispersed to prepare a coating solution. For PVdF, solid mass conversion was performed by using a liquid with a solid dissolved/dispersed therein. A positive electrode plate was prepared by applying the coating solution to an aluminum foil current collector having a thickness of 20 μm.

For the counter electrode (negative electrode), a lithium metal was used for observing the independent behavior of the positive electrode. The lithium metal was brought into close contact with a nickel foil current collector. Here, adjustment was carried out so that the capacity of the nonaqueous electrolyte secondary battery was sufficiently regulated with the positive electrode.

As an electrolyte solution, a solution obtained by dissolving LiPF$_6$ in a mixed solvent including EC/EMC/DMC at a volume ratio of 6:7:7 so that the concentration of LiPF$_6$ was 1 mol/l. As a separator, a polypropylene microporous membrane surface-modified with polyacrylate to improve retention of an electrolyte was used. A nickel plate with a lithium metal foil attached thereon was used as a reference electrode. As an outer package, a metal resin composite film of polyethylene terephthalate (15 μm)/aluminum foil (50 μm)/metal-adhesive polypropylene film (50 μm) was used. Electrodes were stored in the outer package such that open ends of a positive electrode terminal, a negative electrode terminal and a reference electrode terminal were exposed to the outside. Fusion margins with the inner surfaces of the aforementioned metal resin composite film facing each other were airtightly sealed except a portion forming an electrolyte solution filling hole.

The nonaqueous electrolyte secondary battery prepared in the manner described above was transferred to a thermostatic bath set at 25° C., and subjected to an initial charge-discharge step in two cycles. Charge was constant current constant voltage charge with a current of 0.1 CmA and a voltage of 4.6 V. The charge termination condition was set at a time point at which the current value decreased to 0.02 CmA. Discharge was constant current discharge with a current of 0.1 CmA and a final voltage of 2.0 V. In all the cycles, a quiescent period of 30 minutes was set after charge and after discharge. In this way, nonaqueous electrolyte secondary batteries according to Examples and Comparative Examples were completed.

Discharge Test

For the completed nonaqueous electrolyte secondary battery, a high rate discharge test was conducted in accordance with the following procedure. First, constant current constant voltage charge with a current of 0.1 CmA and a voltage of 4.3 V was performed. After 30 minutes of quiescence, constant current discharge with a current of 1 CmA and a final voltage of 2.0 V was performed, and the discharge capacity at this time was recorded as a "discharge capacity (mAh/g)".

Low Temperature Discharge Test

A low temperature discharge test was conducted in accordance with the following procedure. First, constant current constant voltage charge with a current of 0.1 CmA and a voltage of 4.3 V was performed. The charge termination condition was set at a time point at which the current value decreased to 0.02 CmA. After 30 minutes of quiescence, the temperature of the thermostatic bath was set to 0° C., and after elapse of 1 hour after the temperature of the inside of the bath reached 0° C., constant current discharge with a current of 0.1 CmA and a final voltage of 2.0 V was performed, and the discharge capacity at this time was recorded as a "low temperature discharge capacity (mAh/g)". The results are shown in Table 2.

Power Test in Low SOC Region

Subsequently, the temperature of the thermostatic bath was returned to 25° C. After elapse of 1 hour after the temperature of the inside of the bath reached 25° C., constant current constant voltage charge with a current of 0.1 CmA and a voltage of 4.3 V was performed, and an amount of charge at this time was measured. After 30 minutes of quiescence, constant current discharge with a current of 0.1 CmA to pass a current in an amount of electricity equal to 70% of the above-mentioned amount of charge, and at this time, discharge was stopped.

Thirty minutes after discharge was stopped, a test of performing discharge for 1 second at each rate of discharge current was conducted. Specifically, first, discharge was performed at a current of 0.1 CmA for 1 second, and after 2 minutes of quiescence, auxiliary charge was performed at a current of 0.1 CmA for 1 second. Further, after 2 minutes of quiescence, discharge was performed at a current of 1 CmA for 1 second. After 2 minutes of quiescence, auxiliary charge was performed at a current of 0.1 CmA for 10 seconds. Further, after 2 minutes of quiescence, discharge was performed at a current of 2 CmA for 1 second. After 2 minutes of quiescence, auxiliary charge was performed at a current of 0.1 CmA for 20 seconds. From the intercept and gradient of a graph obtained by plotting a voltage 1 second after each rate of discharge against a current value thereof from the result of the above test, and performing fitting by a least square method, a direct current resistance R and E0, a pseudo voltage value of a discharge current 0 CA were each calculated. A power at SOC 30% was determined from the following equation on the assumption that the end-of-discharge voltage was 2.5 V. The power at this time was recorded as a "SOC 30% power (W)". The results are shown in Table 2.

$$\text{SOC 30\% power }(W) = 2.5 \times (E0 - 2.5)/R$$

The battery subjected to the low SOC power test was further subjected to constant current discharge with a current of 0.1 CmA and a final voltage of 2.0 V, and then constant current constant voltage charge with a current of 0.1 CmA and a voltage of 5.0 V. The charge termination condition was set at a time point at which the current value decreased to 0.02 CmA. For the charged battery, the battery was disassembled in a dry room to take out a positive plate. The positive plate that was taken out was attached to a measuring sample holder with a composite stuck to a current collector without performing operations such as washing, and X-ray diffraction measurement was performed by an X-ray diffractometer (manufactured by Rigaku Corporation, model: MiniFlexII) using a CuK$\alpha$ ray source.

In X-ray diffraction patterns of each positive electrode obtained here, whether or not the positive active material charged to 5.0 V was in the form of a single phase having a crystal structure identical to that of an active material in a discharge state, i.e. an $\alpha$-NaFeO$_2$-type crystal structure, and indexed the space group R3-m was checked. The results are shown in the column of "Crystal structure (single phase)" in Table 2 with the rate "o" assigned when the active material was attributable as a single phase of the space group R3-m and the rate "x" assigned when a plurality of phases were observed.

TABLE 2

|  | Half-width (°) | | D50 particle size | Discharge capacity | Low temperature discharge capacity | SOC 30% power | Crystal structure (single phase) |
| --- | --- | --- | --- | --- | --- | --- | --- |
|  | 18.6° ± 1° | 44.1° ± 1° | (μm) | (mAh/g) | (mAh/g) | (W) |  |
| Example 1 | 0.261 | 0.382 | 8 | 170 | 148 | 17 | o |
| Example 2 | 0.258 | 0.362 | 8 | 173 | 149 | 19 | o |
| Example 3 | 0.246 | 0.335 | 8 | 181 | 167 | 24 | o |
| Example 4 | 0.234 | 0.304 | 8 | 186 | 171 | 27 | o |
| Example 5 | 0.224 | 0.278 | 8 | 192 | 175 | 30 | o |
| Example 6 | 0.260 | 0.381 | 5 | 171 | 148 | 18 | o |
| Example 7 | 0.258 | 0.361 | 5 | 175 | 150 | 19 | o |
| Example 8 | 0.247 | 0.333 | 5 | 180 | 166 | 29 | o |
| Example 9 | 0.234 | 0.304 | 5 | 187 | 172 | 31 | o |
| Example 10 | 0.225 | 0.277 | 5 | 192 | 175 | 33 | o |
| Example 11 | 0.223 | 0.278 | 13 | 190 | 174 | 18 | o |
| Example 12 | 0.224 | 0.277 | 15 | 189 | 172 | 16 | o |
| Example 13 | 0.224 | 0.278 | 18 | 190 | 172 | 15 | o |
| Example 14 | 0.223 | 0.278 | 21 | 191 | 172 | 12 | o |
| Example 15 | 0.232 | 0.283 | 8 | 172 | 161 | 25 | o |
| Example 16 | 0.228 | 0.280 | 8 | 179 | 165 | 28 | o |
| Example 17 | 0.219 | 0.276 | 8 | 188 | 173 | 28 | o |
| Example 18 | 0.215 | 0.273 | 8 | 186 | 171 | 27 | o |
| Example 19 | 0.212 | 0.271 | 8 | 183 | 169 | 26 | o |
| Example 20 | 0.210 | 0.269 | 8 | 177 | 164 | 25 | o |
| Example 21 | 0.208 | 0.267 | 8 | 172 | 160 | 25 | o |
| Example 22 | 0.232 | 0.282 | 5 | 173 | 161 | 26 | o |
| Example 23 | 0.229 | 0.280 | 5 | 180 | 167 | 29 | o |
| Example 24 | 0.212 | 0.276 | 5 | 187 | 172 | 29 | o |
| Example 25 | 0.215 | 0.274 | 5 | 188 | 172 | 27 | o |
| Example 26 | 0.211 | 0.271 | 5 | 185 | 170 | 27 | o |
| Example 27 | 0.210 | 0.269 | 5 | 179 | 164 | 26 | o |
| Example 28 | 0.208 | 0.266 | 5 | 174 | 163 | 25 | o |
| Example 29 | 0.224 | 0.278 | 8 | 187 | 170 | 32 | o |
| Example 30 | 0.224 | 0.283 | 8 | 177 | 165 | 24 | o |
| Example 31 | 0.221 | 0.272 | 8 | 175 | 163 | 25 | o |
| Example 32 | 0.226 | 0.283 | 8 | 178 | 165 | 25 | o |
| Example 33 | 0.222 | 0.273 | 8 | 176 | 162 | 24 | o |
| Comparative Example 1 | 0.427 | 0.537 | 8 | 151 | 122 | 11 | o |
| Comparative Example 2 | 0.368 | 0.445 | 8 | 159 | 124 | 13 | o |

TABLE 2-continued

|  | Half-width (°) | | D50 particle size | Discharge capacity | Low temperature discharge capacity | SOC 30% power | Crystal structure (single phase) |
| --- | --- | --- | --- | --- | --- | --- | --- |
|  | 18.6° ± 1° | 44.1° ± 1° | (μm) | (mAh/g) | (mAh/g) | (W) |  |
| Comparative Example 3 | 0.183 | 0.255 | 8 | 148 | 120 | 17 | ○ |
| Comparative Example 4 | 0.142 | 0.231 | 8 | 122 | 78 | 10 | ○ |
| Comparative Example 5 | 0.196 | 0.253 | 8 | 155 | 128 | 23 | ○ |
| Comparative Example 6 | 0.205 | 0.264 | 8 | 158 | 122 | 19 | ○ |
| Comparative Example 7 | 0.205 | 0.263 | 5 | 155 | 124 | 18 | ○ |
| Comparative Example 8 | 0.222 | 0.277 | 8 | 156 | 108 | 16 | x |
| Comparative Example 9 | 0.223 | 0.278 | 8 | 102 | 66 | 8 | x |

As being apparent from Table 2, the discharge capacity at the time of 1 CmA discharge can be improved by using the lithium transition metal composite oxides according to Examples 1 to 33 in which the half-width of a diffraction peak at 2θ=18.6°±1° is 0.20° to 0.27° and/or the half-width of a diffraction peak at 2θ=44.1°±1° is 0.26° to 0.39° on X-ray diffraction patterns using a CuKα radiation, and the lithium transition metal composite oxide is observed as a single phase indexed the space group R3-m on the X-ray diffraction patterns when electrochemically oxidized to a potential of 5.0 V (vs. Li/Li$^+$). A high discharge capacity cannot be obtained in the case where the lithium transition metal composite oxides according to Comparative Examples 1 to 5, 7 and 8, which do not satisfy the above-mentioned requirements, are used. The discharge capacity is low in the case where a lithium transition metal composite oxide having a Li/Me ratio of more than 1.425 is used although the half-width of the diffraction peak satisfies the requirements of the present invention and the lithium transition metal composite oxide is observed as a single phase indexed the space group R3-m when electrochemically oxidized as in Comparative Examples 6 and 7.

It has become apparent that the discharge capacity at a low temperature can be improved by using the lithium transition metal composite oxides according to Examples 3 to 5 and 8 to 33 in which the half-width of a diffraction peak at 2θ=18.6°±1° is 0.208° to 0.247° and/or the half-width of a diffraction peak at 2θ=44.1°±1° is 0.266° to 0.335° on X-ray diffraction patterns among Examples 1 to 33.

Further, it has become apparent that power performance in the low SOC region of the nonaqueous electrolyte secondary battery can be improved by using the lithium transition metal composite oxides according to Examples 3 to 5, 8 to 10 and 15 to 33 in which D50 was 8 μm or less among Examples 3 to 5 and 8 to 33.

In the above-described examples, the value of a molar ratio of Li to the transition metal element Me (Li/Me) in the lithium transition metal composite oxide has been described based on a mixing ratio of a coprecipitation carbonate precursor subjected to the firing step and lithium carbonate. The value of D50 in particle size distribution measurement of the lithium transition metal composite oxide has been described based on results of measuring a particle size distribution for the lithium transition metal composite oxide before preparation of an electrode. However, for a nonaqueous electrolyte secondary battery having a history of charge-discharge, the value of Li/Me and the value of D50 can be determined by performing a treatment in accordance with the following procedure to take a positive active material.

For bringing a positive active material contained in a positive electrode into a state of the discharge end sufficiently, it is preferred to perform an operation to discharge the positive electrode with a cell formed between the positive electrode and a negative electrode capable of releasing lithium ions in an amount required for bringing the positive electrode into a discharge end state sufficiently. As the negative electrode, metal lithium may be used. The cell may be two-terminal cell, but it is preferred that a three-terminal cell provided with a reference electrode is used to control and monitor a positive electrode potential with respect to the reference electrode. Where possible, the electrolyte solution to be used for the cell preferably has a composition identical to that of the nonaqueous electrolyte solution that is used for the nonaqueous electrolyte secondary battery. As the operation to discharge the positive electrode using the cell, examples include a method in which continuous discharge or intermittent discharge is performed with a discharge termination potential of 2.0 V (vs. Li/Li$^+$) at a current of 0.1CmA or less. After the above-described discharge operation is performed, a sufficient quiescent period is provided to confirm that the open circuit potential is 3.0 (vs. Li/Li$^+$) or less. When the open circuit potential after the discharge operation is more than 3.0 V (vs. Li/Li$^+$), it is required to employ a lower value of discharge current to repeat the operation until the open circuit potential becomes 3.0 V (vs. Li/Li$^+$) or less.

The positive electrode which has undergone the above-mentioned operation is preferred to be freed of a deposited electrolyte solution after being taken out from the cell. When an electrolyte solution is deposited, a lithium salt dissolved in the electrolyte solution affects the result of analysis of a value of Li/Me. Examples of the method for removing an electrolyte solution include washing with a volatile solvent. The volatile solvent is preferably one in which a lithium salt is easily dissolved. A specific example is dimethyl carbonate. The volatile solvent is preferred to have a water content reduced to a lithium battery grade. When the water content is high, the value of Li/Me may not be accurately determined due to elution of Li in the positive active material.

Next, a positive composite containing a positive active material is taken from the positive electrode. The positive composite often contains a conducting material and a binder. Examples of the method for removing a binder from a positive composite include a method in which a solvent capable of dissolving a binder is used. Examples include a method in which a positive composite is immersed in a sufficient amount of N-methylpyrrolidone, refluxed at 150° C. for several hours and then separated into a powder containing a positive active material and a solvent containing a binder using filtration or the like when the binder is supposed to be polyvinylidene fluoride. Examples of the method for removing a conducting material from a powder containing a positive active material freed of a binder as described above include a method in which for example when the conducting material is supposed to be a carbonaceous material such as acetylene black, the carbonaceous material is oxidized and decomposed to be removed by a heat treatment. Conditions for the heat treatment are required to include a temperature equal to or higher than a temperature at which the conducting material is thermally decomposed in an atmosphere including oxygen. However, when the heat treatment temperature is excessively high, the physical properties of the positive active material may be changed. Therefore a temperature that does not affect the physical properties of the positive active material wherever possible is preferable. For example, in the case of the positive active material of the present invention, one example of a temperature is 700° C. in the air.

In the research institution to which the inventor belongs, a positive active material was taken from a nonaqueous electrolyte secondary battery using the positive active material from a general lithium transition metal composite oxide by passing through the above operation procedure, and it is confirmed that the value of D50 for the positive active material before preparation of the electrode were almost unchanged. The positive active material according to the present invention is spherical, but some positive active material particles may be collapsed depending on press conditions during preparation of a positive electrode. By observing the positive electrode taken out from the battery using a SEM, an approximate ratio in which the positive active material is collapsed can be known. When a positive active material to be subjected to particle size distribution measurement can be supposed to contain collapsed positive active material particles, it is recommended that a value of D50 be determined after data be corrected on measurement results so that particles of 2 µm or less are excluded.

For the effect of affecting discharge performance by the half-width and particle size of the lithium transition metal composite oxide according to the present invention, the inventors have the following presumption.

The lithium transition metal composite oxide according to the present invention is one of so called "lithium-excess-type" active materials, where lithium may be present not only in the Li layer (3b site) but also in the Me (transition metal) layer (3a site). Here, lithium present in the Me layer may be harder to be diffused in the solid phase as compared to lithium present in the Li layer. Thus, for improving discharge performance of a battery using the lithium transition metal composite oxide according to the present invention, it is important that a layered structure is sufficiently developed in crystallites that form primary particles. This requires that the half-width should not be excessively large, and a certain degree of firing temperature is required in the step of firing the lithium transition metal composite oxide. When primary particles are excessively grown, diffusion in the solid phase is hindered, so that discharge performance of the battery is deteriorated. Accordingly, the half-width should not be excessively small, and the firing temperature should not be excessively high in the step of firing the lithium transition metal composite oxide.

That is, in the lithium transition metal composite oxide according to the present invention, it may be important that crystallites which form primary particles are moderately grown and the particle size of secondary particles is not more than a certain level so that diffusion of lithium in the solid phase is facilitated.

INDUSTRIAL APPLICABILITY

The active material for a nonaqueous electrolyte secondary battery according to the present invention is excellent in various kinds of discharge performance, and therefore can be effectively used for nonaqueous electrolyte secondary batteries such as those of power sources for electric cars, power sources for electronic devices and power sources for electric power storage.

What is claimed is:

1. An active material for a nonaqueous electrolyte secondary battery, the active material comprising a lithium transition metal composite oxide which has an $\alpha$-$NaFeO_2$-type crystal structure, is represented by a compositional formula $Li_{1+\alpha}Me_{1-\alpha}O_2$ where Me is a transition metal element containing Mn, Ni and Co, $0<\alpha<1$, and $\alpha$ satisfies a requirement of $1.250 \leq (1+\alpha)/(1-\alpha) \leq 1.425$,
    wherein a half-width of a diffraction peak at $2\theta=18.6°\pm1°$ is 0.20° to 0.27° and a half-width of a diffraction peak at $2\theta=44.1°\pm1°$ is 0.26° to 0.39° on X-ray diffraction patterns using a CuK$\alpha$ radiation, and the lithium transition metal composite oxide is observed as a single phase indexed a hexagonal crystal and space group R3-m on the X-ray diffraction patterns when electrochemically oxidized to a potential of 5.0 V vs. Li/Li$^+$.

2. The active material for a nonaqueous electrolyte secondary battery according to claim 1, wherein the half-width of a diffraction peak at $2\theta=18.6°\pm1°$ is 0.208° to 0.247° and the half-width of a diffraction peak at $2\theta=44.1°\pm1°$ is 0.266° to 0.335° on X-ray diffraction patterns using a CuK$\alpha$ radiation.

3. The active material for a nonaqueous electrolyte secondary battery according to claim 2, wherein the 50% particle size (D50) in particle size distribution measurement is 8 µm or less.

4. A method for manufacturing the active material for a nonaqueous electrolyte secondary battery according to claim 1, the method comprising:
    coprecipitating a compound of a transition metal element Me containing Co, Ni and Mn in a solution to produce a coprecipitation precursor of a transition metal carbonate; and
    mixing the precursor with a lithium compound such that the molar ratio Li/Me of Li to the transition metal element Me in the lithium transition metal composite oxide is 1.250 to 1.425, and firing the mixture at 800 to 900° C.

5. An electrode for a nonaqueous electrolyte secondary battery, which comprises the active material for a nonaqueous electrolyte secondary battery according to claim 1.

6. A nonaqueous electrolyte secondary battery comprising the electrode for a nonaqueous electrolyte secondary battery according to claim 5.

* * * * *